United States Patent [19]
Rainal et al.

[11] Patent Number: 5,767,995
[45] Date of Patent: Jun. 16, 1998

[54] SYSTEM AND METHODS FOR ASSESSING THE SUITABILITY OF ANALOG LASERS FOR BROADBAND ACCESS APPLICATIONS

[75] Inventors: Attilio J. Rainal, Morristown, N.J.; Venkataraman Swaminathan, North Andover, Mass.

[73] Assignee: Lucent Technologies Inc., Murray Hill, N.J.

[21] Appl. No.: 596,899

[22] Filed: Mar. 13, 1996

[51] Int. Cl.$^6$ .................................................. H04J 14/02
[52] U.S. Cl. .................. 359/110; 359/132; 359/187; 372/23; 372/29
[58] Field of Search .................. 359/110, 132, 359/158, 181, 161, 187; 356/320; 372/23, 28, 29, 32

[56] References Cited

U.S. PATENT DOCUMENTS

| | | | |
|---|---|---|---|
| 4,937,448 | 6/1990 | Mantz et al. | 250/343 |
| 5,027,362 | 6/1991 | Hokanson et al. | 372/29 |
| 5,077,619 | 12/1991 | Toms | 359/187 |
| 5,103,453 | 4/1992 | Kebabian et al. | 372/32 |
| 5,432,629 | 7/1995 | Shikada et al. | 359/187 |
| 5,485,300 | 1/1996 | Daley | 359/187 |
| 5,532,865 | 7/1996 | Utsumi et al. | 359/161 |
| 5,534,996 | 7/1996 | Mori et al. | 359/110 |
| 5,623,355 | 4/1997 | Olsen | 359/110 |
| 5,644,417 | 7/1997 | Aulet et al. | 359/110 |

*Primary Examiner*—Leslie Pascal

[57] ABSTRACT

A system and method for predicting the ratio of the strength of the carrier signal to the strength of nonlinear distortion (C/NLD) generated by a communications laser is disclosed. The method jointly evaluates the individual distortion components arising from laser clipping and from inherent laser P-I nonlinearity. According to the method, the laser P-I curve is measured with high precision to quantify the P-I nonlinearity. Various derivatives of the P-I curve are determined and then utilized to calculate C/NLD as a function of a communications network parameter such as the optical modulation index per channel or rms modulation index. Based on this information, the laser can be identified in terms of its sensitivity to RF drive variations in the field. Lasers can be tagged, etc., depending on their C/NLD sensitivity. In this manner, a laser having a C/NLD ratio appropriate for the requirements of a broadband transmission network, such as a SCM CATV system, can be selected and installed in such a system.

14 Claims, 4 Drawing Sheets

SYSTEM AND METHODS FOR ASSESSING THE SUITABILITY OF ANALOG LASERS FOR BROADBAND ACCESS APPLICATIONS

FIELD OF THE INVENTION

The present invention relates to analog lasers useful for broadband access communication applications. More particularly, the present invention relates to a system and methods for assessing distortion in such lasers.

BACKGROUND OF THE INVENTION

Lightwave transmission systems utilizing lightwave technology in combination with subcarrier multiplexing (SCM) represent the simplest and most economical means of implementing broadband transmission networks. An example of such a broadband transmission network is a cable television (CATV) network. In SCM, a broadband analog signal consisting of the sum of many modulated subcarriers is applied to amplitude modulate the intensity of an analog laser for transmission by optical fiber. Such laser intensity modulation is also useful for interconnecting broadband RF signals using optical fiber, such as, for example, between a cellular base station and its remote antenna sites.

A basic component of lightwave transmission systems is the laser, which, as noted above, is directly modulated by the multiplexed broadband signal. The laser bias is set to meet a certain optical power budget of the analog fiber link and the optical modulation index per channel (m) is suitably adjusted to achieve the desired carrier-to-noise (C/N) and carrier to non-linear distortion (C/NLD) ratios of the network. Some flexibility is provided in the laser transmitter to optimize the m to compensate for the field conditions and the aging of the laser during service.

The demand for increased channel capacity as well as longer fiber links places a severe constraint on the C/N and C/NLD requirements since, among other reasons, the signal to noise ratio decreases as the number of channels increase. The lasers used in this service are typically operated near their fundamental limits. In particular, the lasers are usually operated at an m where clipping occurs, wherein the laser current drops below the threshold current and the laser provides zero power. The excursions of current below the threshold induce additional distortions that translate into degradation of C/NLD resulting in poor picture quality. Of even more serious concern is the potential for catastrophic failure, i.e., loss of signal, of the analog fiber link. This may occur since near clipping C/NLD varies rapidly with RF drive and therefore any adjustment to the RF drive made in the field can drive the laser to clipping.

In order to satisfy the stringent distortion requirements described above, the light power or intensity versus current input (P-I curve) should be highly linear for frequencies of interest. It has been recently reported by Gorfinkel et al., however, that the P-I curve of the distributed feedback (DFB) laser now used in CATV networks is inherently nonlinear. See Gorfinkel et al., "Fundamental Limits for linearity of CATV lasers," J. Lightwave Tech., Vol. 13, pp. 252–60, Feb. 1995. This publication, and all other publications mentioned in this specification are incorporated herein by reference. Gorfinkel et al. reported that the resulting second order distortion is no lower than about –62 dB relative to the signal power in the highest channel of an 80 channel 60–540 MHz system operating with an optical modulation index per channel of 3 percent. This second order distortion is of concern because it is very near the tolerance limit of present SCM CATV systems.

There are particular C/N and C/NLD specifications associated with broadband transmission networks, such as a CATV system. Such specifications are a function of the number of channels desired for the system as well as other parameters. The lasers operating in such a system must therefore perform to those specifications. Yet, the information typically provided by the manufacturer concerning such lasers is not the C/NLD ratio, but rather the P-I curve. The C/NLD ratio is not provided since determining this ratio is complicated and costly, while P-I data is readily obtained.

Since there has not been a method for determining the C/NLD ratio from the nonlinear P-I curve that includes laser clipping, this ratio is typically not known before placing a laser in a SCM CATV system. As such, there is no assurance that the lasers purchased for the system will perform adequately. Identifying a substandard laser that has been placed in a such a system can be very time consuming. And, once identified, it must be returned to the manufacturer and replaced. Furthermore, such a laser may contribute to the aforementioned catastrophic failures. Thus, to drive the cost of transmitters down and quality up, a reliable assurance methodology with regard to the clipping and distortion characteristics of such lasers is essential.

Prior models and methods for estimating the overall distortion of such lasers usually add, on a power basis, the two individual components resulting from laser clipping and the P-I curve. Such approaches are approximate at best since distortion is a highly nonlinear phenomenon. Furthermore, most prior work has generally assumed the P-I curve to be linear, ignoring any contribution of the P-I curve to nonlinear distortion. That simplifying assumption was made since it was generally believed that the contribution to nonlinear distortion from the P-I curve of the laser was relatively insignificant compared to the nonlinear distortion caused by laser clipping. See, for example, Rainal, A. J., "Laser Intensity Modulation as a Clipped Gaussian Process," IEEE Trans. Comm., Vol. 43., no. 2/3/4, pp. 490–494, Feb./ Mar./ Apr. 1995; Rainal, A. J., "Distortion Spectrum of Laser Intensity Modulation," IEEE Trans. Comm., Vol. 43, no. 2/3/4, pp. 1644–1652, Feb./Mar./Apr. 1995.

Thus, there is a need for an improved method that jointly evaluates the effects of clipping and laser P-I nonlinearity in analog lasers. Such a method would improve the quantitative prediction of laser performance and provide a method for screening lasers in terms of their C/NLD sensitivity.

SUMMARY OF THE INVENTION

A system and method for predicting the C/NLD dependence of an analog laser on the optical modulation index per channel, m, or other parameters, is disclosed. The method utilizes a new model that jointly evaluates the individual distortion components arising from laser clipping and from inherent laser P-I nonlinearity. According to the method, the laser's P-I curve is measured with high precision to quantify the laser's P-I nonlinearity. Various derivatives of the P-I curve are determined and then utilized to calculate C/NLD per channel as a function of m or other parameters. Prior to the present invention, it was not known that the derivatives of the nonlinear P-I curve could be used to derive the C/NLD ratio that includes the effect of laser clipping.

In a further embodiment, the present invention provides a method for "tagging" analog lasers in terms of their C/NLD sensitivity. Based on the C/NLD versus m curve, the laser can be identified in terms of its sensitivity to RF drive variations in the field. Lasers can be tagged or otherwise identified as a function of such C/NLD sensitivity. In this manner, a laser having a C/NLD ratio appropriate for the requirements of a broadband transmission network, such as a SCM CATV system, can be selected and installed in such a system.

A computer-controlled system for performance testing analog lasers lasers comprising a processor, controllable current source, laser, optical power measurement device and output device is disclosed. The processor controls the current source to increase, in a step-wise manner, the current supplied to the laser. The power measurement device measures the optical power generated by the laser and sends a signal indicative of such power, for each current level, to the processor. Utilizing the present method, the processor calculates C/NLD performance and the output device displays such information. In a preferred embodiment, the output device is a printer that generates a tag that provides C/NLD performance and that can be attached to the laser.

BRIEF DESCRIPTION OF THE DRAWINGS

The present invention will become more apparent from the following detailed description of specific embodiments thereof when read in conjunction with the accompanying drawings, in which like elements have like reference numbers and in which.

DETAILED DESCRIPTION

Figure 1:
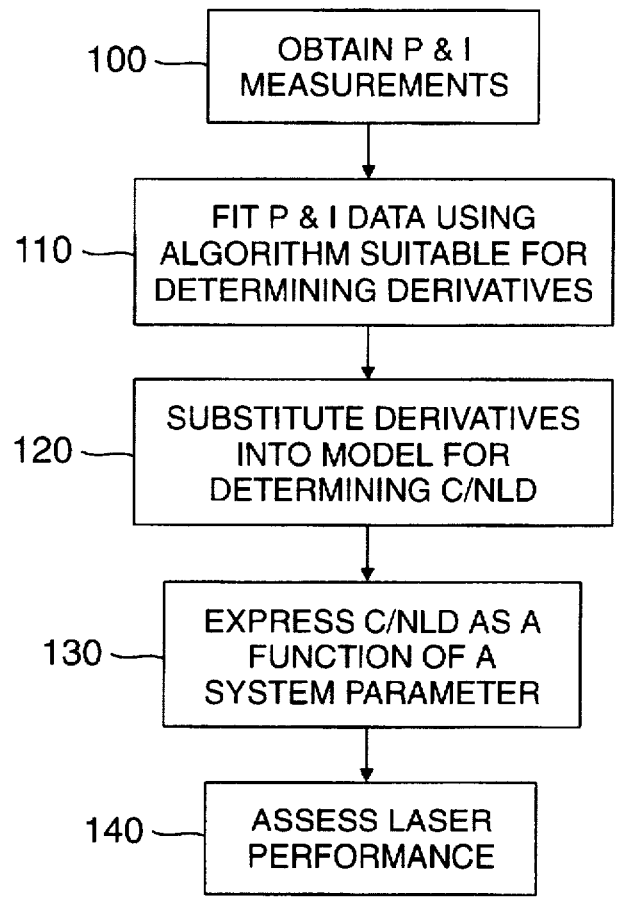
FIG. 1 is a block flow diagram of embodiments of a method according to the present invention.

The present method utilizes a new model for evaluating the joint distortion resulting from laser clipping and laser P-I nonlinearity. Before describing a system and several embodiments of a method according to the present invention, the theoretical underpinnings of the model will be presented.

The limiting nonlinear P-I curve for analog lasers presently preferred for broadband transmission networks, such as CATV, is given by:

$$P(I) = -B + (B^2 + C)^{0.5} \quad [1]$$

where: B and C are linear in I and are given by $B = K_1 I + K_3$ and $C = K_2 I$, with $K_1 = 1.154$ mW/mA, $K_2 = 8.784 \times 10^3$ (mW)$^2$/mA, $K_3 = 1.193 \times 10^4$ mW.

Expression [1] represents the best, i.e., least non-linear performance, achieveable by the distributed feedback (DFB) lasers now used in CATV networks. Expression [1] is based on a recently developed model for the DFB laser. See Gorfinkel et al., "Fundamental Limits for Linearity of CATV Lasers," J. Lightwave Tech., vol. 13, pp. 252–60, Feb. 1995. It will be appreciated that a real laser, as opposed to a theoretical one, typically will not perform this well.

Broadband transmission networks preferably employ lightwave transmission systems utilizing lightwave technology in combination with subcarrier multiplexing (SCM). In SCM, a broadband analog signal consisting of the sum of many modulated subcarriers is applied to amplitude modulate the intensity of an analog laser for transmission by optical fiber. This multiplexed broadband analog signal can be represented by a modulating current, I(t). The modulating current can be represented by a stationary Gaussian process having a normalized, uniform power spectral density defined as:

$$W_I(f) = 1/(f_b - f_a) \text{ for } f_a \leq f \leq f_b, \text{ otherwise } W_I(f) = 0, \quad [2]$$

where: $f_a$ and $f_b$ are the lower and upper bounds, respectively, of the bandwidth of the multiplexed signal. For example, $f_a = 60$ MHz and $f_b = 540$ MHz in a 60–540 MHz network. Typically, the upper bound $f_b$ will be a maximum of about 1 GHz.

The performance per channel of a SCM CATV system can be characterized by the carrier-to-nonlinear distortion ratio for channel $f_i$ for a given order of distortion, k, C/NLD$^k_i$. This ratio is given by:

$$C/NLD_i^k = \frac{h_{0i}^2/(1-r)}{\sum_k \frac{h_{0k}^2}{k!} W_k(f_i)} \quad [3]$$

The various parameters appearing in [3] above are as defined below:

$$r = f_a/f_b, \quad h_{0k} =$$

$$\{1/[\sigma_x(2\pi)^{0.5}]\} \int_\theta^\infty P(I) H_k[(I - I_2\sigma_x)/\sigma_x] \exp[-(I - I_2\sigma_x)^2/(2\sigma_x^2)] dI,$$

$\sigma = \mu I = \mu(I_b - I_{th}) = \mu(I_2 \sigma_x)$, $I_b$=laser bias current, $I_{th}$=laser threshold current, $I_2$=normalized clipping level, $\mu = m(N/2)^{0.5} = 1/I_2$ =rms modulation index, m=optical modulation index per channel, N=the number of channels, $H_k(x) = (-1)^k \exp(x^2/2)[(d_k/dx^k) \exp(-x^2/2)]$=Hermite Polynomials, $$W_k(f) = 4 \int_0^\infty \rho^k(\tau) \cos[2\pi f \tau] d\tau, \text{ and}$$

$$\rho(\tau) = \int_0^\infty W_I(f) \cos[2\pi f \tau] df = \frac{\sin[\pi(1-r)\tau]}{\pi(1-r)\tau} \cos[\pi(1+r)\tau].$$

Since P(I) is nonlinear, evaluating $h_{0k}$ becomes quite complex. An accurate estimate, $\hat{h}_{0k}$ however, can be obtained by expanding P(I) in a Taylor series with remainder, as shown in expression [4] below:

$$P(I) = -B + (B^2 + C)^{0.5} = P'(0)I + [P''(0)I^2]/2! + [P'''(0)I^3]/3! + [P^{(4)}(\xi)I^4]/4! \quad [4]$$

where primes denote the first three derivatives of P, $P^{(4)}$ denotes the fourth derivative of P, and $0 \leq \xi \leq I$. It should be understood that other fitting algorithms suitable for determining the n-order derivatives of P(I) can be used. Many such algorithms are known to those skilled in the art. Using the first three terms of expression [4] in the integral for $h_{0k}$ yields the following estimate $\hat{h}_{0k}$ for $h_{0k}$:

$$\hat{h}_{01} = P'(0)\sigma_x \Phi(I_2) + P''(0)\sigma_x^2[\phi(I_2) + I_2 \Phi(I_2)] + \frac{P'''(0)}{2} \sigma_x^3[I_2 \phi(I_2) + (I_2^2 + 1)\Phi(I_2)], \quad [5]$$

$$\hat{h}_{02} = P'(0)\sigma_x \phi(I_2) - P''(0)\sigma_x^2 \Phi(I_2) + P'''(0)\sigma_x^3[\phi(I_2) + I_2 \Phi(I_2)], \quad [6]$$

$$\hat{h}_{03} = -P'(0)\sigma_x I_2 \phi(I_2) + P''(0)\sigma_x^2 \phi(I_2) + P'''(0)\sigma_x^3 \Phi(I_2), \quad [7]$$

For $k \geq 4$, $$h_{0k} = (-1)^k P'(0) \sigma_x H_{k-2}(I_2) \phi(I_2) + P''(0) \sigma_x^2 H_{k-3}(I_2) \phi(I_2) + P'''(0) \sigma_x^3 H_{k-4}(I_2) \phi(I_2), \quad [8]$$

where: $\phi(x)$ and $\Phi(x)$ denote the normal density and distribution functions, respectively, given by:

$$\phi(x) = \frac{[\exp(-x^2/2)]}{(2\pi)^{0.5}} \quad [9]$$

$$\Phi(x) = \int_{-\infty}^{x} \phi(x) dx. \quad [10]$$

It is not necessary to use to the fourth derivative of P in evaluating $h_{0k}$ since it will have a neglible value. The fourth derivative is useful, however, for error analysis. As previously noted, the P-I curve presented in expression [1] is based on a recent theory of operation of the DFB laser. A particular "real-world" laser may be described by a P-I curve that is different from the one presented in expression [1] and also different from all other real-world lasers. The present model applies to such other P-I relations, as well. Thus, the P-I curve for such a real-world analog laser is expanded, for example, in a Taylor-series with a remainder and used to solve expression [3].

The above-described model thus provides a method, illustrated in operation blocks 100–130 of FIG. 1, for calculating the $C/NLD^k_i$ per channel of an analog laser based on P-I measurements. In operation block 100, power (P) and current (I) measurements are obtained from an analog laser. Current from a suitable source is supplied stepwise, i.e., in 1 milliamp increments, to the laser. Light output is measured by a calibrated optical power meter. Such a meter should have an accuracy of 10 microwatts or better. Preferably, a minimum of one hundred intensity/current data points are obtained to characterize the curve with high accuracy. Data should be obtained up to at least twice the proposed operating current of the laser.

In operation block 110, the P and I data is applied to a fitting algorithm to derive the first through third derivatives of the P-I curve. For example, as described above, a Taylor series expansion (least squares polynomial) can be fit to the data as follows:

$$P(I) = a_1 I + a_2 I^2 + a_3 I^3 + a_4 I^4.$$

Then, the first, second and third derivatives $P'(0)$, $P''(0)$ and $P'''(0)$ of the P-I curve are determined by setting $P'(0)=a_1$, $P''(0)=2a_2$ and $P'''(0)=6a_3$.

Expressions [5]–[8], as appropriate, are then solved and then substituted into expression [3] to determine the carrier-to-nonlinear distortion ratio per channel, $C/NLD^k_i$. The laser threshold current, $I_b$, can be obtained from the laser manufacturer or otherwise determined.

The $C/NLD^k_i$ is then expressed, in operation block 130, as a function of the optical modulation index, m, or more preferably, the rms modulation index, $\mu=m(N/2)^{0.5}=1/I_2$ for a variety of laser bias currents, $I_b$. Alternatively, $C/NLD^k_i$ can be expressed as a function of $I_b$.

In a further embodiment, the present invention provides a method for "tagging" analog lasers, i.e., identifying or categorizing the lasers by their $C/NLD^k_i$ per channel performance. In this manner, the suitability of a tagged laser for use in a particular broadband transmission network having particular $C/NLD^k_i$ requirements can be assessed. Such an embodiment is illustrated by operation blocks 100–140 of FIG. 1. As described above, $C/NLD^k_i$ performance of the laser as a function of modulation index or a related parameter is determined according to blocks 100–130. In operation block 140, the laser performance is assessed based on the $C/NLD^k_i$ relation. The assessment of laser performance is described further below in conjunction with FIG. 2.

Figure 2:
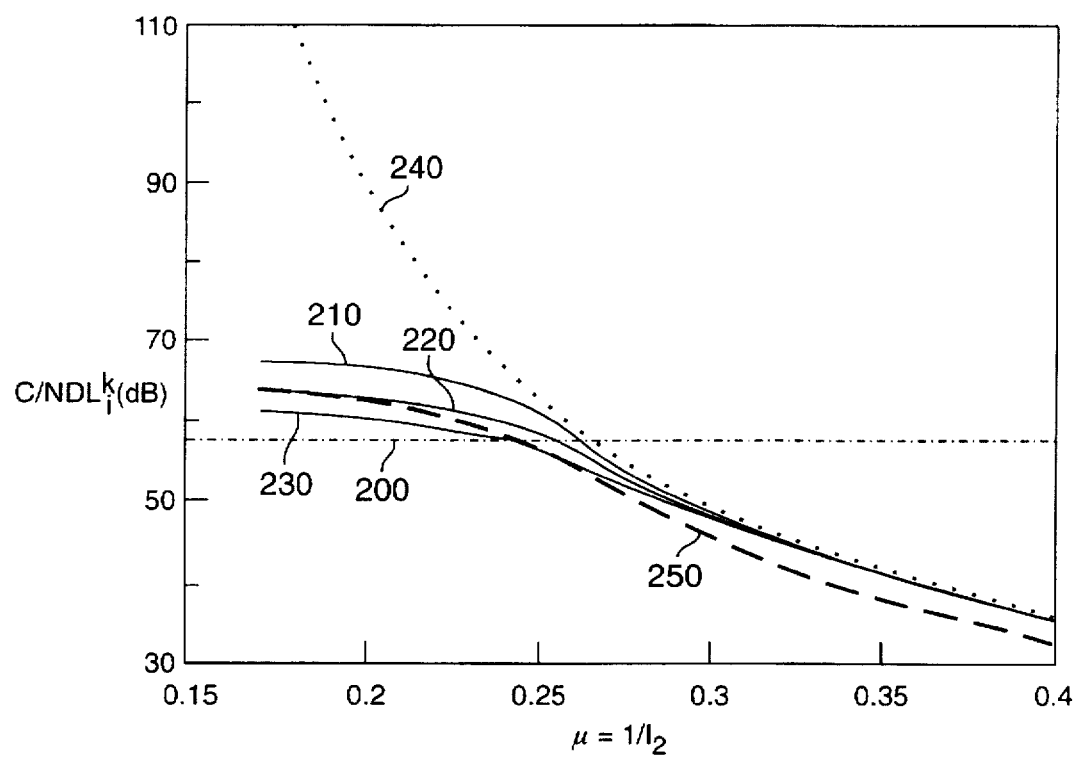
FIG. 2 is a plot of C/NLD vs. rms modulation index, μ.

FIG. 2 is a plot of $C/NLD^k_i$ vs. $\mu$ for the theoretical P-I curve described by expression [1]. Thus, this plot represents the best signal to noise ratio achievable from the DFB lasers currently in use in CATV systems. The horizontal line designated by the reference numeral 200 represents a typical target value in CATV systems for the $C/NLD^k_i$ ratio, e.g., 58 dB. The curve designated by the reference numeral 210 is the $C/NLD^k_i$ ratio as a function of $\mu$ for the mid channel for the sum of the first three even orders of distortion, $k=2, 4$ and 6 when the laser bias current, $I_b$, is 30 mA. Similarly, the curves designated 220 and 230 provide the $C/NLD^k_i$ ratio as a function of $\mu$ as per curve 210 except that the $I_b$ is 40 mA and 50 mA, respectively. The curve designated 240 provides the $C/NLD^k_i$ ratio as a function of $\mu$ for the mid channel for the sum of the first three odd orders of distortion, $k=3, 5$ and 7 at $I_b=30, 40$ and 50 mA. The curve designated 250 provides the $C/NLD^k_i$ ratio as a function of $\mu$ for all orders of distortion at $I_b=40$ mA.

In CATV systems, $\mu$ is typically less than about 0.3. Indeed, FIG. 2 shows that preferably, $\mu$ should be less than about 0.25 for the lasers used in such systems. Thus, by developing a $C/NLD^k_i$ vs. $\mu$ relation for a laser, the laser's suitability for use in a particular broadband transmission network, such as CATV, can be determined. In particular, knowing the $\mu$ of the system, it can readily be determined if a particular analog laser is suitable for use in such system. For example, for a first laser, the $C/NLD^k_i$ vs. $\mu$ relation may show a $C/NLD^k_i$ of 62 at $\mu=0.23$ for a laser bias current of 40 mA. A second laser may show a $C/NLD^k_i$ of 47 at $\mu=0.23$ at $I_b=40$ mA. If the system requirements call for a $C/NLD^k_i$ of 60 at $\mu=0.23$, then the first laser is acceptable on this basis and the second is not. In this manner, as indicated in operation block 140, $C/NLD^k_i$ performance is assessed. This operation block can include physically "tagging" or otherwise indicating the laser's $C/NLD^k_i$ performance. It will be recognized that such a tag or other indicator can present a $C/NLD^k_i$ performance curve, a value of $C/NLD^k_i$ at a given m, $\mu$ or $I_b$, or a relative or qualitative ranking based on the $C/NLD^k_i$.

It will be appreciated that after determining the $C/NLD^k_i$ for a large number of analog lasers, it may be possible to classify a laser as "suitable" or, alternatively, "unsuitable" for a particular system on the basis of its P-I curve without actually determining the $C/NLD^k_i$ of the laser. Thus, in a further embodiment, the present invention provides a method for classifying an analog laser as to its suitability for a given transmission system having particular $C/NLD^k_i$ performance requirements without determining the laser's $C/NLD^k_i$ performance. According to the method, the P-I curve of a first analog laser and historical data for other analog lasers consisting of a P-I curve and corresponding $C/NLD^k_i$ for each of such other lasers is used to evaluate the suitability of the first laser for the system. The historical data may be summarized into guidelines, etc., such that the method does not require data base comparison but rather an evaluation of how the P-I curve of the first laser compares to the guidelines. The guidelines may relate to the linearity of the P-I curve or to other aspects of the P-I curve as developed from the historical data. The development of such guidelines is within the capabilities of those skilled in the art once presented with the data.

Figure 3:
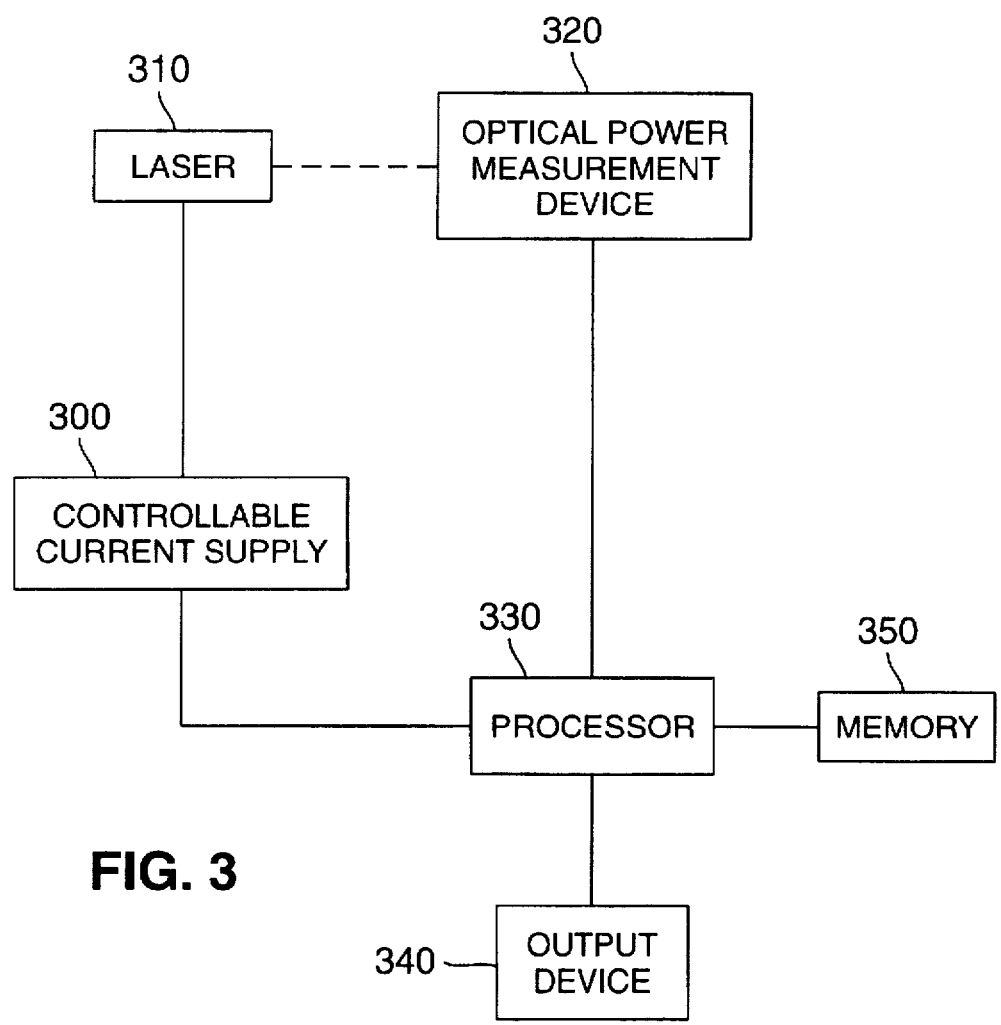
FIG. 3 is a block diagram of a system according to the present method.
Figure 4:
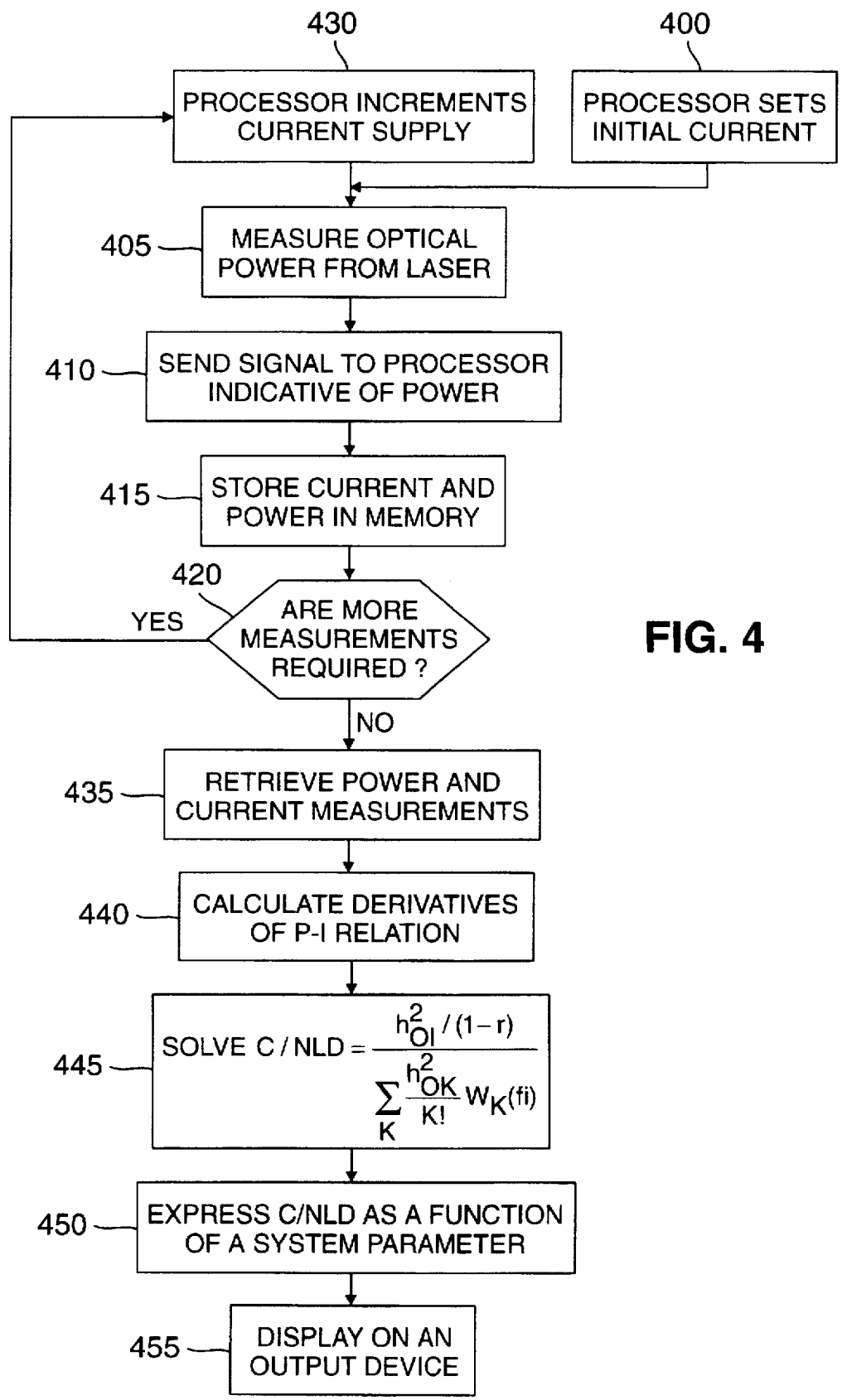
FIG. 4 is a block flow diagram of a method for using the system of FIG. 3 according to the present invention.

Laser tagging or performance assessment, as well as determining laser $C/NLD^k_i$, according to the above-described embodiments of the present invention, can be performed by the laser manufacturer or the customer. The only data required is an accurate characterization of the P-I curve of the laser. As previously described, such a characterization can be obtained, for example, by taking power measurements at 1 mA current intervals. The aforementioned methods may be implemented by a computer-controlled system, an exemplary embodiment of which is illustrated in FIG. 3. FIG. 4 is a flow chart that illustrates how the exemplary system of FIG. 3 can be used according to the present invention.

As shown in FIG. 3, a controllable current source 300 is electrically connected to a laser 310. The current source 300 is also electrically connected to a processor 330. The processor 330 controls the current source 300 to apply, and step-wise increase, the current supplied to the laser 310. Preferably, the current source 300 is capable of stepping the current in increments of one mA or less. Thus, in operation block 400 of FIG. 4, the processor 330 sets the initial current, which can be selected based on the threshold current, $I_{th}$, of the laser, if known.

The laser 310 is in optical communication with an optical power measurement device 320 suitable for measuring the light, e.g., power, that is output from the laser 310. One suitable device is an optical power meter. Power readings are taken at each current level, as indicated in operation block 405. Preferably, the optical power measurement device 320 should have an accuracy of ten μW or better. The optical power measurement device 320 is operable to send a signal to the processor 330 indicative of the power reading obtained at each current level. Such a signal is sent as indicated in step 410. Power and current measurements are stored in a computer storage device or memory, 350, as indicated in operation block 415.

As previously described, power measurements preferably are obtained up to about twice the intended operating current of the laser. Thus, if it is determined in decision block 420 that more measurements should be obtained, the processor increments the current supply 300 as indicated in operation block 430. As previously noted, preferably the current is increased in one mA increments, or less.

If it is determined in decision block 420 that no further measurements should be taken, the processor determines $C/NLD^k_i$ as indicated in operation blocks 435 through 450. In particular, the processor 330, which is operable to retrieve the power and current measurements from the computer storage device or memory 350 does so, as indicated in operation block 435. As indicated in operation block 440, the processor utilizes the methods described in this specification to determine the derivatives of the relation defined by the power and current measurements. Then, as indicated in operation blocks 445 and 450, $C/NLD^k_i$ is calculated and expressed as a function of a system parameter such as, preferably, the modulation index, m, the rms modulation index, μ or the laser bias current, $I_b$. The processor 330 is further electrically connected to an output device 340, such as a printer or monitor. Thus, as indicated in operation block 455, the $C/NLD^k_i$ performance may be displayed as a plot on the monitor or printer. In a further embodiment, a tag having $C/NLD^k_i$ performance results for a laser can be generated by the printer. Such a tag can then be attached to the laser associated with such performance.

It should be understood that the embodiments described herein are illustrative of the principles of this invention. Various modifications of the present invention may occur to, and be implemented by, those skilled in the art without departing from the scope and spirit of the invention.

We claim:

1. A method for assessing the suitability of an analog laser for a broadband transmission network utilizing a multiplexed signal comprised of a plurality of modulated subcarriers, each of which subcarriers is associated with a channel of the network and used for amplitude modulating the intensity of an analog laser, the network characterized by an optical modulation index per channel, an rms modulation index and a minimum acceptable value for $C/NLD^k_i$, which is a ratio of the strength, for a given channel, of one of the modulated subcarrier signals to the strength of nonlinear distortion generated by the laser, comprising the steps of:

(a) obtaining signal data pertaining to output power, P, from the laser as a function of current, I, supplied to the laser;

(b) determining the first, second and third derivatives of a relation defined by the signal data;

(c) determining $C/NLD^k_i$ as a function of a parameter selected from the group consisting of the modulation index and an expression related to the modulation index, wherein $C/NLD^k_i$ is determined utilizing the derivatives determined in step (b) and is given by $$C/NLD^k_i = \frac{h^2_{0i}/(1-r)}{\sum_k \frac{h^2_{0k}}{k!} W_k(f_i)},$$

where: $r=f_a/f_b$, $f_a$ and $f_b$ being the lower and upper bounds, respectively, of the bandwidth of the multiplexed signal.

$$h_{0k} =$$

$$\{1/[\sigma_x(2\pi)^{0.5}]\} \int_0^\infty P(I)H_k[(I-I_2\sigma_x)/\sigma_x]\exp[-(I-I_2\sigma_x)^2/(2\sigma_x^2)]dI,$$

$\sigma_x=\mu I=\mu(I_b-I_{th})=\mu(I_2\sigma_x)$, $I_b$=laser bias current, $I_{th}$=laser threshold current, $I_2$=normalized clipping level, μ=m $(N/2)^{0.5}=1/I_2$=rms modulation index, m=optical modulation index per channel, N=the number of channels, $H_k(x)=(-1)^k\exp(x^2/2)[(d_k/kx^k)\exp(-x^2/2)]$=Hermite Polynomials, $$W_k(f) = 4\int_0^\infty \rho^k(\tau)\cos[2\pi f\tau]d\tau, \text{ and}$$

$$\rho(\tau) =$$

$$\int_0^\infty W_I(f)\cos[2\pi f\tau]df = \frac{\sin[\pi(1-r)\tau]}{\pi(1-r)\tau} \cos[\pi(1+r)\tau]; \text{ and}$$

(d) comparing the minimum acceptable value of $C/NLD^k_i$ for the network with the value of $C/NLD^k_i$ determined in step (c) at the modulation index per channel or the rms modulation index of the network to assess the suitability of the laser for use in the network.

2. The method of claim 1 wherein step (b) further comprises:

(i) curve fitting the P and I signal data obtained in step (a) using a least squares polynomial of the form $P(I)=a_1I+a_2I^2+a_3I^3+a_4I^4$; and (ii) determining the first, second and third derivatives of the P-I signal relation, $P'(0)$, $P''(0)$ and $P'''(0)$, respectively, by setting $P'(0)=a_1$, $P''(0)=2a_2$ and $P'''(0)=6a_3$.

3. The method of claim 1 where the broadband transmission network is a cable television network.

4. A method for characterizing the performance of an analog laser, wherein the intensity of the laser is amplitude modulated by a multiplexed signal comprised of a plurality of modulated subcarrier signals, comprising the steps of:
   (a) obtaining signal data pertaining to output power, P, from the laser as a function of current, I, supplied to the laser;
   (b) determining the first, second and third derivatives of a relation defined by the signal data; and
   (c) determining $C/NLD^k_i$, which is a ratio of the strength of one of the modulated subcarrier signals to the strength of nonlinear distortion generated by the laser, as a function of a parameter selected from the group consisting of optical modulation index per channel, rms modulation index and laser bias current, wherein $C/NLD^k_i$ is determined utilizing the derivatives determined in step (b) and is given by $$C/NLD_i^k = \frac{h_{01}^2/(1-r)}{\sum_k \frac{h_{0k}^2}{k!} W_k(f_i)},$$

where: $r=f_a/f_b$, $f_a$ and $f_b$ being the lower and upper bounds, respectively, of an assumed bandwidth of the multiplexed signal, $h_{0k} =$ $$\{1/[\sigma_x(2\pi)^{0.5}]\} \int_0^\infty P(I) H_k[(I-I_2\sigma_x)/\sigma_x] \exp[-(I-I_2\sigma_x)^2/(2\sigma_x^2)] dI,$$

$\sigma_x = \mu I = \mu(I_b - I_{th}) = \mu(I_2\sigma_x)$, $I_b$=laser bias current, $I_{th}$=laser threshold current, $I_2$=normalized clipping level, $\mu = m(N/2)^{0.5} = 1/I_2$=rms modulation index, m=optical modulation index per channel, N=number of channels, $H_k(x) = (-1)^k \exp(x^2/2)[(d_k/dx^k) \exp(-x^2/2)]$=Hermite Polynomials, $$W_k(f) = 4 \int_0^\infty \rho^k(\tau) \cos[2\pi f\tau] d\tau, \text{ and}$$

$$\rho(\tau) = \int_0^\infty W_f(f) \cos[2\pi f\tau] df = \frac{\sin[\pi(1-r)\tau]}{\pi(1-r)\tau} \cos[\pi(1+r)\tau].$$

5. The method of claim 4 further comprising the step of
   (d) assigning an identifier to the laser, the identifier providing an indication of laser performance based on $C/NLD^k_i$ at one or more values of the selected parameter.

6. The method of claim 4 wherein step (b) further comprises:
   (i) curve fitting the P and I signal data obtained in step (a) using a least squares polynomial of the form $P(I)=a_1 I + a_2 I^2 + a_3 I^3 + a_4 I^4$; and
   (ii) determining the first, second and third derivatives of the P-I signal relation, $P'(0)$, $P''(0)$ and $P'''(0)$, respectively, by setting $P'(0)=a_1$, $P''(0)=2a_2$ and $P'''(0)=6a_3$.

7. The method of claim 4 and further comprising the steps of:
   (d) repeating steps (a) through (c) for a plurality of analog lasers; and
   (e) developing a guideline for determining whether a laser for which $C/NLD^k_i$ has not been determined is suitable or unsuitable for use in a transmission system having a minimum $C/NLD^k_i$ requirement, wherein the guideline is developed by analyzing and trending the P and I data and corresponding $C/NLD^k_i$ determined for the plurality of analog lasers in step (d) according to known methods.

8. The method of claim 7 and further comprising the step of:
   (f) Determining the suitability or unsuitability of an uncharacterized analog laser for which the $C/NLD^k_i$ has not been determined for use in the transmission system by
       (i) performing step (a) for the uncharacterized laser; and
       (ii) comparing the data obtained in step (i) with the guideline.

9. A system for testing an analog laser, which laser is suitable for use in communication networks and is modulated by a multiplexed signal comprised of a plurality of modulated subcarrier signals and generates nonlinear distortion, comprising:
   a laser;
   a controllable current source electrically connected to the laser and operable to supply current to the laser;
   an optical power measurement device in optical communication with the laser and operable to measure the optical power generated by the laser, the optical power measurement device further operable to send a signal indicative of the optical power measurement obtained at each current level to a processor; and
   the processor, which is electrically connected to the controllable current source and operable to increase, in a step-wise manner, the current supplied to the laser by the controllable current source, and further operable to calculate, from the optical power measurements, a ratio of the strength of one of the modulated subcarrier signals to the strength of the nonlinear distortion as a function of a parameter of the communication system, the processor further operable to provide the ratio, or an indicator related thereto, to an output device.

10. The system of claim 9 further comprising a memory, in communication with the processor, for storing optical power measurements as a function of the current supplied to the laser.

11. The system of claim 9 wherein the parameter is selected from the group consisting of optical modulation index per channel, rms modulation index and laser bias current.

12. The system of claim 9 wherein the output device is a printer.

13. The system of claim 12 wherein the printer generates a tag that provides an indication of the test results.

14. The system of claim 13 wherein the tag is attached to the laser.

* * * * *